United States Patent [19]

Cosh

[11] Patent Number: 4,568,978
[45] Date of Patent: Feb. 4, 1986

[54] METHOD OF A CIRCUIT ARRANGEMENT FOR PRODUCING A GAMMA CORRECTED VIDEO SIGNAL

[75] Inventor: Ian S. Cosh, Cambridge, England

[73] Assignee: U.S. Philips Corporation, New York, N.Y.

[21] Appl. No.: 504,103

[22] Filed: Jun. 15, 1983

[30] Foreign Application Priority Data

Jun. 30, 1982 [GB] United Kingdom ............. 8218883
Apr. 5, 1983 [GB] United Kingdom ............. 8309208

[51] Int. Cl.$^4$ ............................................. H04N 5/20
[52] U.S. Cl. ............................... 358/164; 358/32; 358/169; 328/145
[58] Field of Search ............... 358/32, 164, 169; 328/145

[56] References Cited

U.S. PATENT DOCUMENTS 4,394,688 7/1983 Iida et al. ...................... 358/164
4,499,494 2/1985 Dischert et al. .................. 358/164

OTHER PUBLICATIONS

SMPTE Journal, vol. 88, "A Digital Telecine Processing Channel", by Oliphant et al, pp. 470–480, (7–79).
IEEE Transactions on Broadcasting, vol. BC-22, No. 4, "On the Use of a Television System in Image Reproduction: Part 1-The Image Processing System", by Lappalainen et al, pp. 109-112, (12-76).

Primary Examiner—Tommy P. Chin
Assistant Examiner—Michael D. Parker
Attorney, Agent, or Firm—Thomas A. Briody; William J. Streeter; Marianne Rich

[57] ABSTRACT

A gamma correction factor is applied to a video signal without need of the normally used multiplier by forming the logarithm of the logarithm of the video signal and algebraically adding this signal to a second signal representing the logarithm of the correction factor. The anti-log of the anti-log of the resulting signal constitutes the gamma corrected signal. Analog and digital implementations of the circuitry are illustrated.

10 Claims, 4 Drawing Figures

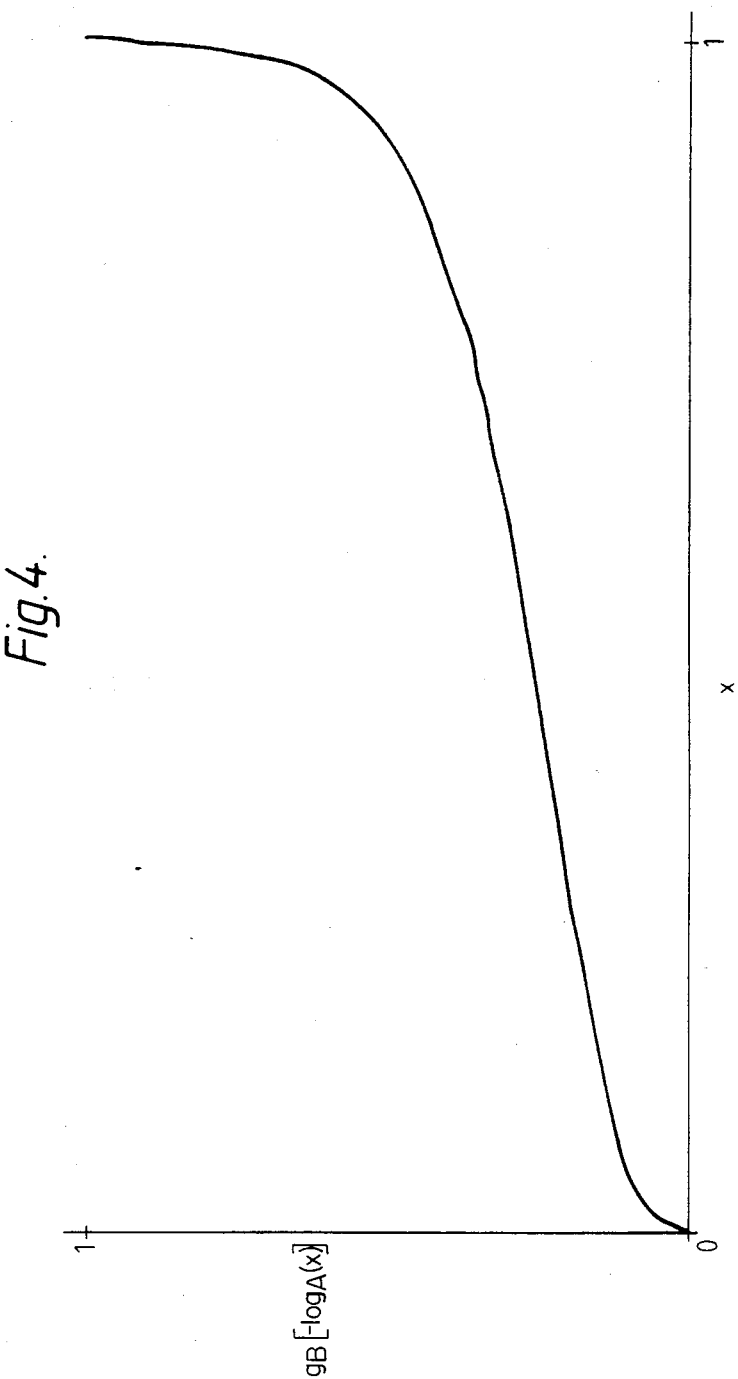

METHOD OF A CIRCUIT ARRANGEMENT FOR PRODUCING A GAMMA CORRECTED VIDEO SIGNAL

BACKGROUND OF THE INVENTION

1. Field of the Invention

The invention relates to a method of and a circuit arrangement for producing a gamma corrected video signal.

2. Description of the Prior Art

Display tubes for television introduce a distortion of the picture information due to a non-linear relationship between the applied signal voltage and the resulting screen brightness. This relationship may be approximated by the expression $$L_o = K V_s^\delta$$

where
- $L_o$ = Light output
- K = constant
- $V_s$ = applied signal voltage
- $\delta$ = constant, known as gamma.

Typically $\delta$ has a value of 2.5 whereas ideally it would be 1.0.

To prevent this distortion becoming apparent to the viewer the video signal is transmitted in a modified form by passing the signal through a gamma correction circuit which introduces a complementary distortion. The modification carried out by a gamma corrector may be described by the expression $$V_s = V_i^{1/\delta} = V_i^G$$

where
- $V_s$ = output signal for transmission
- $V_i$ = input signal requiring modification
- $\delta$ = constant, as before.

In practice the value of $\delta$ employed in the gamma correction circuit may not be exactly 2.5 but chosen to give the best subjectively pleasing result.

It is sometimes necessary, for example in television cameras, to perform the inverse operation to derive an uncorrected signal from a previously gamma corrected signal. In this specification the term gamma correction is to be understood to include both the correction of an uncorrected signal and the derivation of an uncorrected signal from a corrected signal.

Gamma correction is normally achieved by first converting the input signal into its logarithm, then multiplying this signal by the desired correction factor G, and finally applying the resultant signal to an exponential or anti-logarithm converter. Such an arrangement is disclosed in an article entitled "Transistorised Non-Linear Function Generation" by P. Kundu and S. Banerji which was published in Industrial Electronics, January 1964 at pages 35 to 41.

If the signals are expressed in digital form, as is increasingly common, the same approach can be followed except that logarithmic and exponential conversion may then be achieved by means of 'look-up' tables stored in programmable read only memories (PROMs). Some difficulty is encountered, however, with the multiplication process which must be performed on each digital sample within the sample period, typically 75 ns. The digital signal, after conversion into its logarithm, may be 12 bits wide and the correction coefficient, G, 6 or more bits wide. The multiplication of a 12 bit number by a 6 bit number within 75 ns entails either complex circuitry to form and add partial products, or the use of integrated circuit multipliers which consume considerable power and are relatively expensive.

SUMMARY OF THE INVENTION

It is an object of the invention to provide a method of a gamma correcting a television signal which does not require the use of a multiplier circuit, and to enable the production of a circuit arrangement for performing the method.

The invention provides a method of gamma correcting (as hereinbefore defined) a video signal comprising the steps of: forming a first signal representative of the logarithm of the logarithm of the video signal; forming a second signal of representative of the logarithm of the correction factor; forming a third signal representative of the algebraic sum of the first and second signals; and forming a fourth signal representative of the exponential of the exponential of the third signal, the fourth signal being the gamma corrected signal.

The invention further provides a circuit arrangement for gamma correcting (as hereinbefore defined) a video signal applied to an input thereof comprising means for forming a first signal representative of the logarithm of the logarithm of the input signal, means for forming a second signal representative of the logarithm of the correction factor, means for forming a third signal representative of the algebraic sum of the first and second signals, means for forming a fourth signal representative of the anti-logarithm of the exponential of the third signal, and means for feeding the fourth signal to an output of the circuit arrangement as the gamma corrected signal.

The circuit arrangement may be such that the first signal P is equal to $\log_B(-\log_A V_i)$ where $V_i$ is the input signal, the second signal Q is equal to $\log_B G$ where G is the correction factor, the third signal R is equal to $P \pm Q$, and the fourth signal is equal to $A \exp(-B \exp R)$, where A and B are constants.

This method and circuit arrangement enables the multiplier of prior art arrangements to be replaced by an adder or a subtractor as appropriate. Where digital signals are employed adders and subtractors can be fabricated more cheaply than multipliers and can operate more quickly. The sampling rate agreed by the European Broadcasting Union for digital television standards is 13.5 MHz which means that the time available for processing each sample is less than 75 nSecs.

When the video signal $V_i$ is in digital form the first, second and third means may comprise programmed digital memory devices which digital memory devices may comprise programmable read only memories.

This enables a relatively simple construction from readily available standard integrated circuits.

When choosing the bases for the logarithms it is convenient to make A equal to $2^n$ where n is the number of bits in each sample of the input signal. B may be conveniently chosen to be equal to $10^x$ where $x = [\log_{10}(-\log_A A - 1/A)]$.

It may be noted that in a gamma correction circuit which comprises a read only memory code converter is disclosed in a paper entitled "Digital Processing Amplifier and Colour Encoder" by Yoshizumi Eto, Kazuyuki Matsui, Shizuka Ishibashi, and Hiroyuki Terui which was published in SMPTE Journal, Volume 87, January 1978, pages 15 to 19. However the arrangement described therein will only produce a fixed gamma correction it not being possible to alter the correction factor.

Embodiments of the invention will now be described, by way of example, with reference to the accompanying drawings, in which:

BRIEF DESCRIPTION OF THE DRAWING

FIG. 4 is a graph of the function $y = [\log_B(-\log_A(x))]$.

DESCRIPTION OF THE PREFERRED EMBODIMENTS

Figure 1:
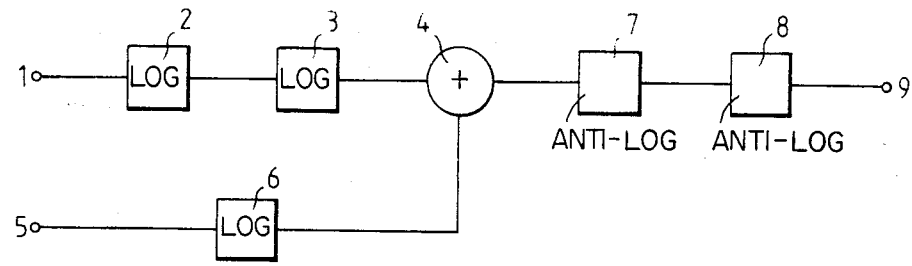
FIG. 1 illustrates in block schematic form the principle of gamma correction according to the invention.

FIG. 1 illustrates the principle used in the invention for producing a modified signal which does not involve the use of multipliers and comprises an input 1 for a video signal $V_i$ which input is connected to a log conversion unit 2 for producing a first output equal to $\log_A V_i$. The output of unit 2 is connected to a log conversion unit 3 for producing a second output signal equal to $\log_B (\log_A V_i)$. The second output signal is applied to a first input of an adder 4. A correction factor G is connected via a second input 5 of the arrangement to a unit 6 which produces a third output signal equal to $\log_B G$, the third output signal being connected to a second input of the adder 4. The adder 4 produces a fourth output signal equal to $\log_B (\log_A V_i) + \log_B G$ which is fed to an antilog conversion unit 7 which produces a fifth output signal equal to $G \log_A V_i$. The fifth output signal is fed to an antilog conversion unit 8 which produces a sixth output signal equal to $V_i^G$ which sixth output signal is applied to an output terminal 9 of the arrangement.

Since in a television signal the black level and peak white level must remain at defined amplitudes it is necessary to define the input signal $V_i$ as being in the range of $0 \leq V_i \leq 1$. However, since the logarithm of a number having a value between 0 and 1 is always negative it is not possible to find the second logarithm $[\log_B (\log_A V_i)]$ since, mathematically, there is no logarithm of a negative number.

However, in this case, for the purpose of achieving the multiplication function the sign of the multiplicand may be ignored and the multiplicand treated as a positive number even though it is in fact negative. This applies in this case since the multiplicand is always negative and the multiplier G is always positive; consequently the product is always negative.

Figure 2:
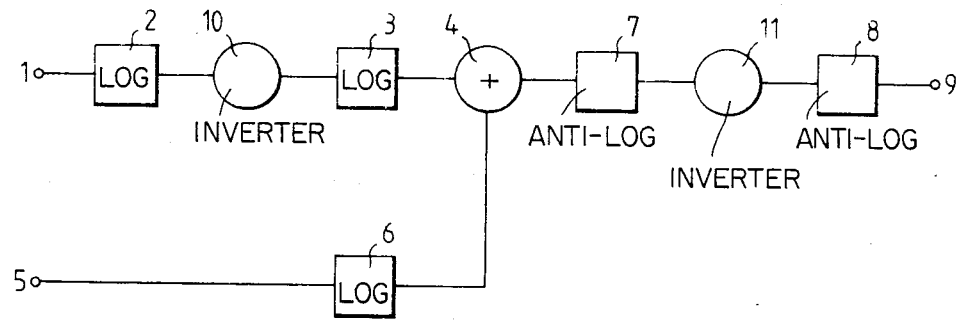
FIG. 2 shows in block schematic form a first embodiment of a circuit arrangement for gamma correcting an input video signal according to the invention.

This procedure is shown functionally in FIG. 2 in which those items having the same functions as corresponding items in FIG. 1 have been given the same reference numerals. In the arrangement shown in FIG. 2 a unit 10 is added which multiplies the output of unit 2 by $-1$ to give an output signal equal to $-\log_A V_i$ which means in turn that the first input of the adder 4 receives a signal equal to $\log_B (-\log_A V_i)$. As a result the output of the adder is equal to $\log_B (-\log_A V_i) + \log_B G$ and the output of unit 7 is equal to $-G \log_A V_i$. This signal is then multiplied by $-1$ in a unit 11 to give an output $G \log_A V_i$ which is then applied to the unit 8.

If the input signal $V_i$ is in analog form the log and antilog conversion units may be realised as amplifiers having logarithmic and exponential characteristics respectively, the units 10 and 11 by inverting amplifiers, and the adder 4 as a summing amplifier.

Figure 3:
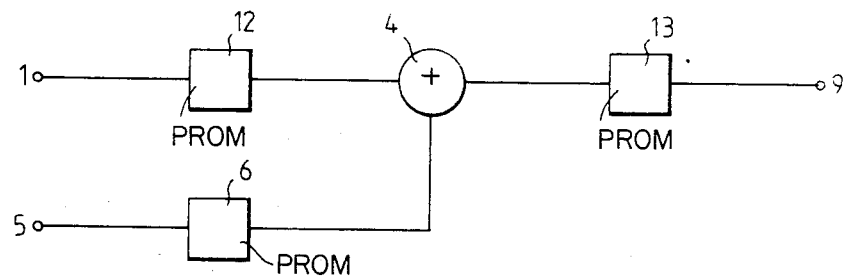
FIG. 3 shows in block schematic form a second embodiment of a circuit arrangement for gamma correcting an input video signal according to the invention.

If the input signal $V_i$ is in digital form then the log and antilog conversion units may be formed as programmable read only memories (PROMS) and the units 10 and 11 may be incorporated in the respective PROM since their only effect is to change the sign of the output. In practice, with a digital input signal a further simpliciation can be made as illustrated in FIG. 3. In the arrangement shown in FIG. 3 a PROM 12 replaces units 2, 3 and 10 and a PROM 13 replaces unit 7, 8 and 11. The arrangement then simplifies to three PROMS 6, 12 and 13 and an adder 4. With this arrangement the PROM 12 is programmed to give an output equal to $[\log_B (-\log_A V_i)]$ in response to an input signal $V_i$, the PROM 6 is programmed to give an output equal to $\log_B G$ in response to an input signal G, and the PROM 13 is programmed to give an output A exp $]-B$ exp $(R)]$ where $R = P + Q$ $P = \log_B (-\log_A V_i)$, and $Q = \log_B G$.

The embodiments described may be modified to perform the inverse function, that is to convert a previously gamma corrected signal into an uncorrected signal or $V_s = V_i^{1/G}$. The only modification required is to replace the adder 4 by a subtractor so that at the output of the subtractor the function $\log_B (-\log_A V_i) - \log_B G$ is formed. Such an inverse operation may be useful within television camera circuits or in special effects generators.

The choise of logarithm bases A and B is arbitrary but there are certain values which ease implementation.

If base A is related to the resolution of the input variable, $V_i$, the dependent variable P can be made positive for all non-zero values of $V_i$. $V_i$ may, for example, be a ten bit binary number representing values in the range $$\frac{0}{1024} \leq V_i \leq \frac{1023}{1024}$$

If base A is chosen as $2^{10}$, that is 1024, then the intermediate variable, $I = [-\log_{1024}(V_i)]$, varies between 0.00014095 and 1.0 as $V_i$ varies between 1023/1024 and 1/1024.

The zero value, $V_i = (0/1024,)$ is a special case, discussed hereinafter.

The second logarithm base, B, acts as a scaling constant and is conveniently chosen such that $$0 \leq P \leq 1 \text{ for } \frac{0}{1024} \leq V_i \leq \frac{1023}{1024}$$

This is achieved by making $$B = 10^x$$

where $x = [\log_{10} (-\log_{1024} (1023/1024))]$ rounded up. For the values given B = 7095.

The general form of the fuction $$y = [\log_B (-\log_A (x))]$$

is as shown in FIG. 4.

By differential calculus it can be shown that the minimum gradient if the function $y = [\log_B (-\log_A (x))]$ occurs for a value of $x=1/e$. At this point the gradient of the function is $$\text{gradient}_{min} = \frac{e}{\log_e B} = .3066 \ (B = 7096)$$

For each input code to translate to a unique output code the output code must have four times the resolution of the input code. Consequently if the input is defined by ten bits, the output should have twelve bits. If the value of $[\log_B G]$ is subtracted instead of added then inverse operation is achieved, i.e. the output signal becomes $$V_S = V_i^{(1/\delta)}$$

In practice certain circumstances require special attention when the input value $V_i=0$ the output $V_s$ must also be zero. This can be done by detecting the zero value of the input code either by a multiple input 'NOR' gate having one input for each input bit or by using an extra output from PROM 12. When the zero input code is detected the output code, $V_s$, can be artificially forced to zero.

For large values of $V_i$ the adder may overflow. This is readily detected by sensing the 'carry-out' output of the adder. In the event of overflow the output, $V_s$, must be artificially forced to unity. Conversely, if inverse operation is being done then the state of 'underflow' of the subtractor must be sensed and the output, $V_s$, forced artificially to zero.

I claim:

1. A method of correcting a video signal by a gamma correction factor, comprising the steps of:
    forming a logarithm of a logarithm of said video signal, thereby creating a first signal;
    forming a logarithm of said correction factor, thereby creating a second signal;
    algebraically adding said first and second signals, thereby forming a third signal; and
    forming an anti-logarithm of an anti-logarithm of said third signal, thereby creating a fourth signal, said fourth signal constituting said video signal corrected by said gamma correction factor.

2. A method as claimed in claim 1, wherein said first signal (P) is equal to $\log_B (-\log_A V_i)$ where $V_i$ is said video signal, wherein said second signal (Q) is equal to $\log_B G$ where G is said correction factor, wherein said third signal (R) is equal to $P \pm Q$, and said fourth signal is equal to $A \exp(-B \exp R)$, where A and B are constants.

3. A method as claimed in claim 2, in which the video signal is in digital form and A is equal to $2^n$ where n is the number of bits defining the amplitude of the video signal.

4. A method as claimed in claims 2 or 3 wherein $B=10^x$ where $x=\log_{10}[-\log_A(A=1/A)]$.

5. A circuit arrangement for correcting a video signal applied to an input thereof by a gamma correction factor comprising means for forming a first signal representative of a logarithm of a logarithm of said video signal, means for forming a second signal representative of a logarithm of said correction factor, means for forming a third signal representative of the algebraic sum of said first and second signals, means for forming a fourth signal representative of an anti-logarithm of an anti-logarithm of said third signal, and means for feeding said fourth signal to an output of the circuit arrangement as said video signal corrected by said gamma correction factor.

6. A circuit arrangement as claimed in claim 5, wherein said first signal (P) is equal to $\log_B (-\log_A V_i)$ where $V_i$ is said video signal, said second signal is equal to $\log_B G$ where G is said correction factor, said third signal (R) is equal to $P \pm Q$, and said fourth signal is equal to $A \exp(-B \exp R)$, where A and B are constants.

7. A circuit arrangement as claimed in claim 5 or claim 6, in which said video signal is in digital form, and wherein the first, second and third means comprise programmed digital memory devices.

8. A circuit arrangement as claimed in claim 6, in which $A=1024$.

9. A circuit arrangement as claimed in claim 6, in which $B=10^x$ where $x=[\log_{10}(-\log_A(A-1/A)]$.

10. A circuit arrangement as claimed in claim 5, in which the resolution of said gamma corrected signal is four times that of said video signal.

* * * * *

UNITED STATES PATENT AND TRADEMARK OFFICE
CERTIFICATE OF CORRECTION

PATENT NO. : 4,568,978
DATED : February 4, 1986
INVENTOR(S) : Ian S. Cosh

It is certified that error appears in the above-identified patent and that said Letters Patent is hereby corrected as shown below:

Claim 4 Col 6 Line 10 change " $-\mathrm{Log}_A(A=1/A)$ " to -- $-\log_A(\frac{A-1}{A})$ --

Claim 9 Col 6 Line 41 change "(A-1/A)" to -- $(\frac{A-1}{A})$ --

Signed and Sealed this

Twenty-second Day of March, 1988

*Attest:*

DONALD J. QUIGG

*Attesting Officer*      *Commissioner of Patents and Trademarks*